Figure 1:
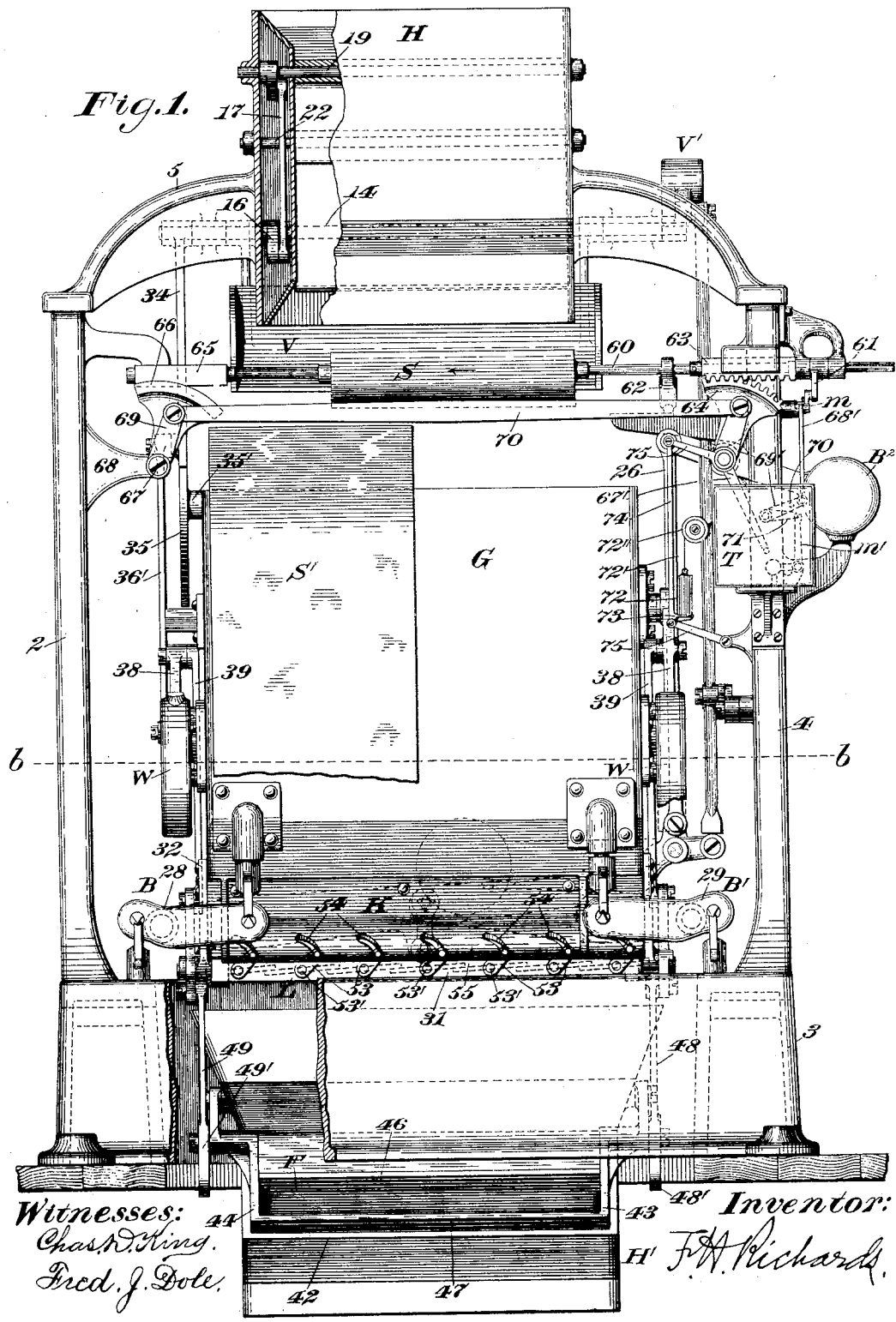

(No Model.) 9 Sheets—Sheet 1.

F. H. RICHARDS.
WEIGHING MACHINE.

No. 589,298. Patented Aug. 31, 1897.

Witnesses:
Chas. D. King.
Fred. J. Dole.

Inventor:
F. H. Richards.

(No Model.) 9 Sheets—Sheet 5.

F. H. RICHARDS.
WEIGHING MACHINE.

No. 589,298. Patented Aug. 31, 1897.

Witnesses:
Chas. N. King.
Fred. J. Dole.

Inventor:
F. H. Richards.

(No Model.)  F. H. RICHARDS.  9 Sheets—Sheet 6.
WEIGHING MACHINE.
No. 589,298.  Patented Aug. 31, 1897.
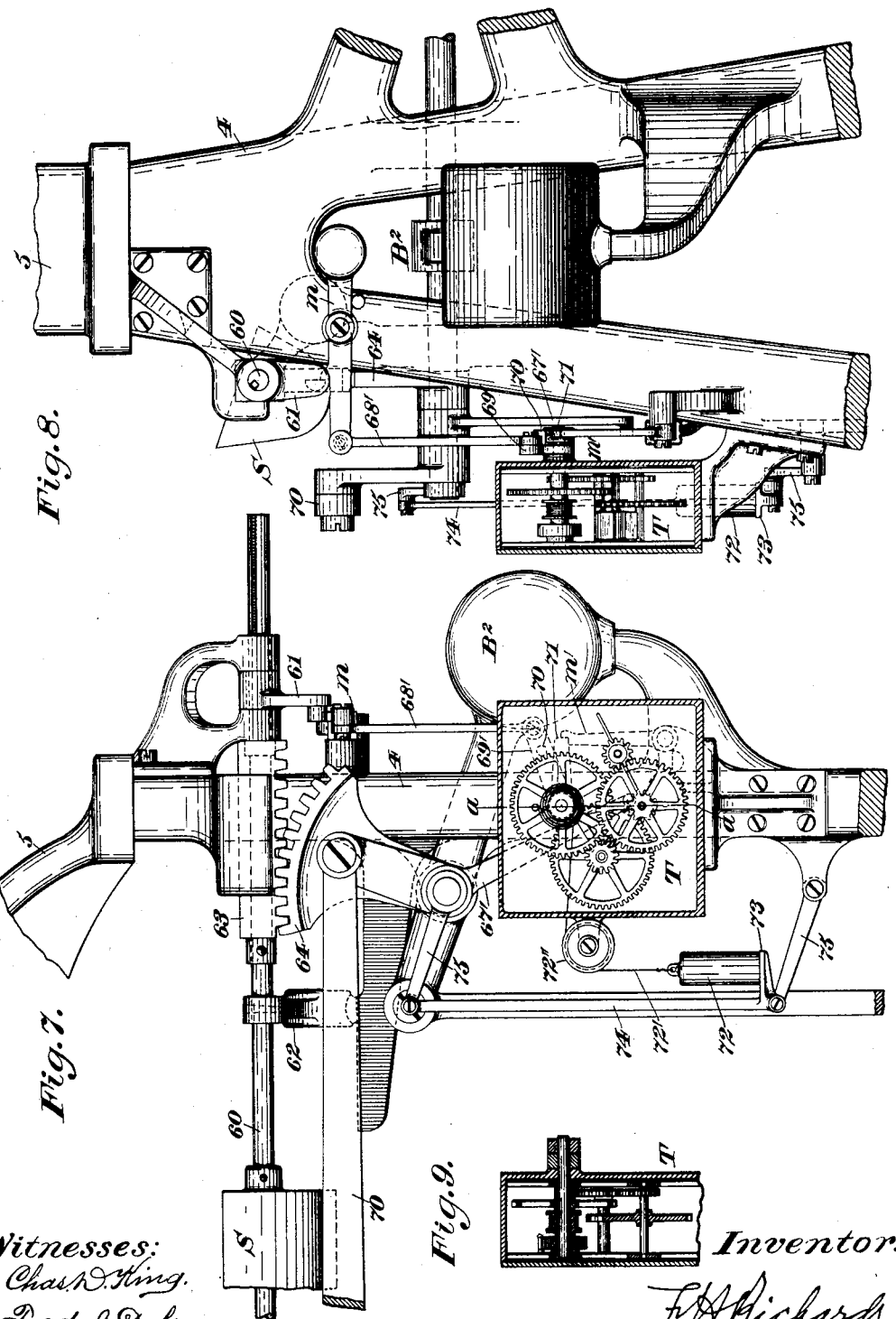
Witnesses:
Chas. D. King.
Fred. J. Dole.
Inventor:
F. H. Richards.

(No Model.)  9 Sheets—Sheet 7.

F. H. RICHARDS.
WEIGHING MACHINE.

No. 589,298. Patented Aug. 31, 1897.

Witnesses:
Chas. N. King.
Fred. J. Dole.

Inventor:
F. H. Richards (No Model.) 9 Sheets—Sheet 8.

F. H. RICHARDS.
WEIGHING MACHINE.

No. 589,298. Patented Aug. 31, 1897.

Witnesses:
Chas. F. King.
Fred. J. Dole.

Inventor:
F. H. Richards.

(No Model.)

9 Sheets—Sheet 9.

F. H. RICHARDS.
WEIGHING MACHINE.

No. 589,298.

Patented Aug. 31, 1897.

Witnesses:
Chas. D. King.
Fred. J. Dole.

Inventor:
F. H. Richards.

THE NORRIS PETERS CO., PHOTO-LITHO., WASHINGTON, D.C.

UNITED STATES PATENT OFFICE.

FRANCIS H. RICHARDS, OF HARTFORD, CONNECTICUT.

WEIGHING-MACHINE.

SPECIFICATION forming part of Letters Patent No. 589,298, dated August 31, 1897.

Application filed May 13, 1897. Serial No. 636,300. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines.

One object of my present invention is to provide, in connection with the load-receiver and main stream-supply apparatus, an oscillatory auxiliary supply device or load-completer supported above the entrant end of the load-receiver and reciprocative, independent of its oscillatory movement, in proportion to the movements of the load-receiver relatively to a given point to vary the volume of material delivered from said auxiliary supply device to the load-receiver in proportion to the requirements, as indicated by the position of said load-receiver with respect to a true poising position, and also to provide means controlled by the weighing mechanism for imparting to the said auxiliary supply device a load-discharge movement after the same has arrived at the proper position with relation to the load-receiver for supplying the requisite amount of material to complete the load.

A further object of the invention is to provide, in connection with a load-receiver of a weighing-machine, an improved closer comprising a series of independent closer-blades pivotally supported for rotative movements in relatively different arcs and also for unitary movement in the same arc, and to provide means, in connection with said closer of the load-receiver, for retaining the closer-blades normally in their closed positions and for effecting an opening movement of said closer-blades simultaneously with the unitary oscillatory movements thereof.

A further object of the invention is to provide, in connection with the load-receiver and closer of a weighing-machine, a regulator located below said closer and a closer-governing float supported on the regulator for movements inward and outward with relation to the vertical axis thereof and operatively connected with the closer in such manner as to prevent the shutting of said closer during the passage of material through the regulator.

Figure 2:
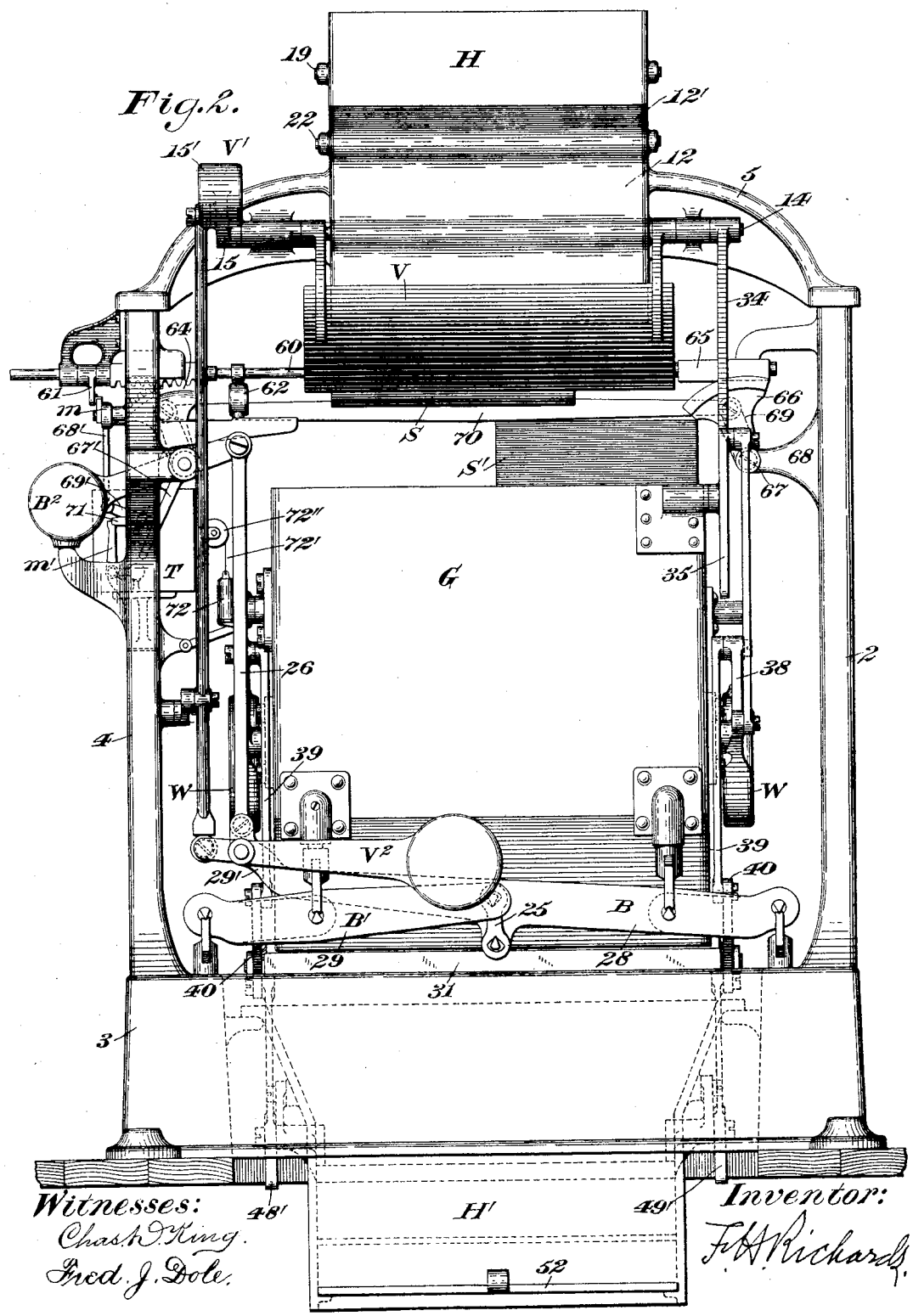
Figure 3:
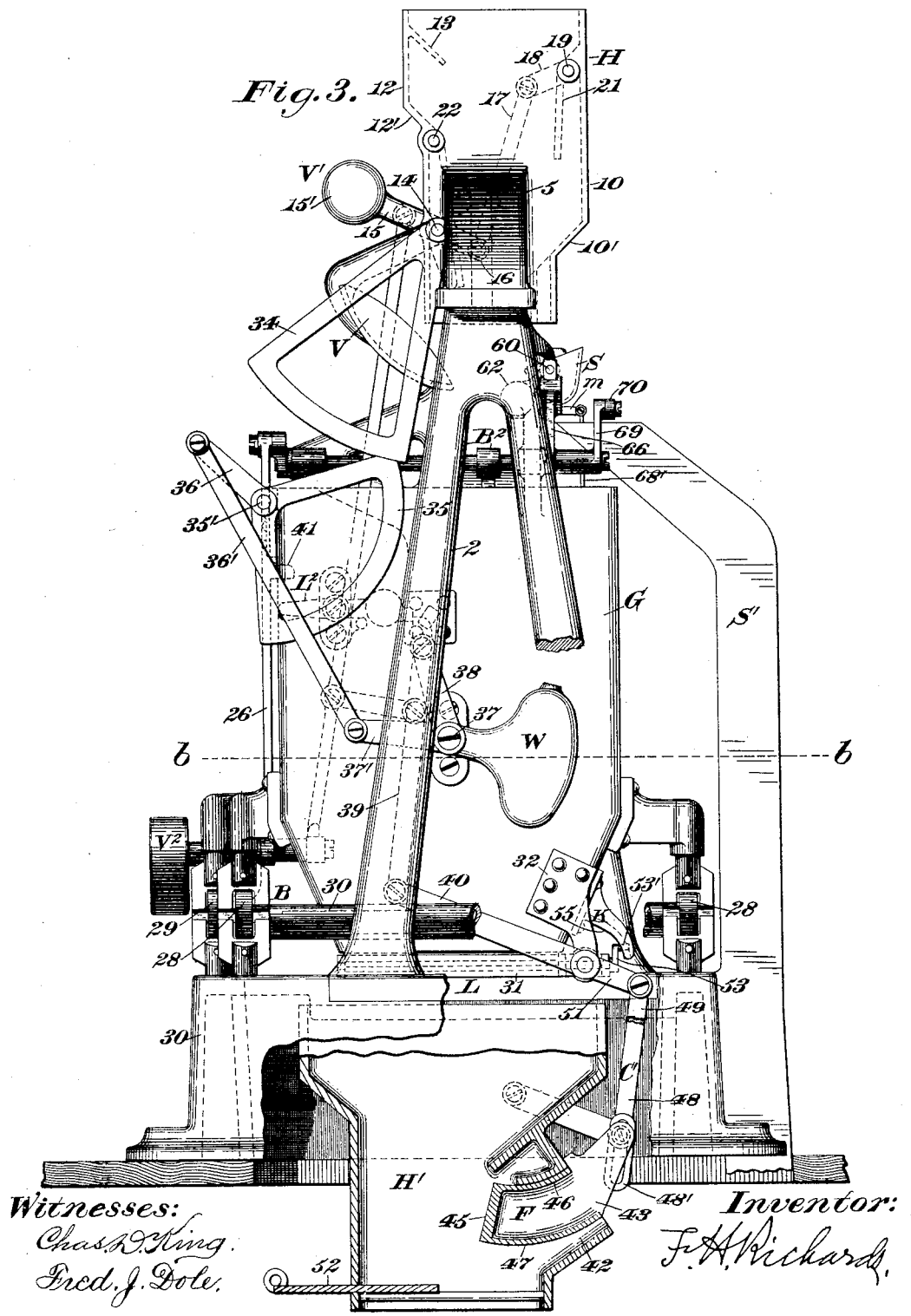
Figure 4:
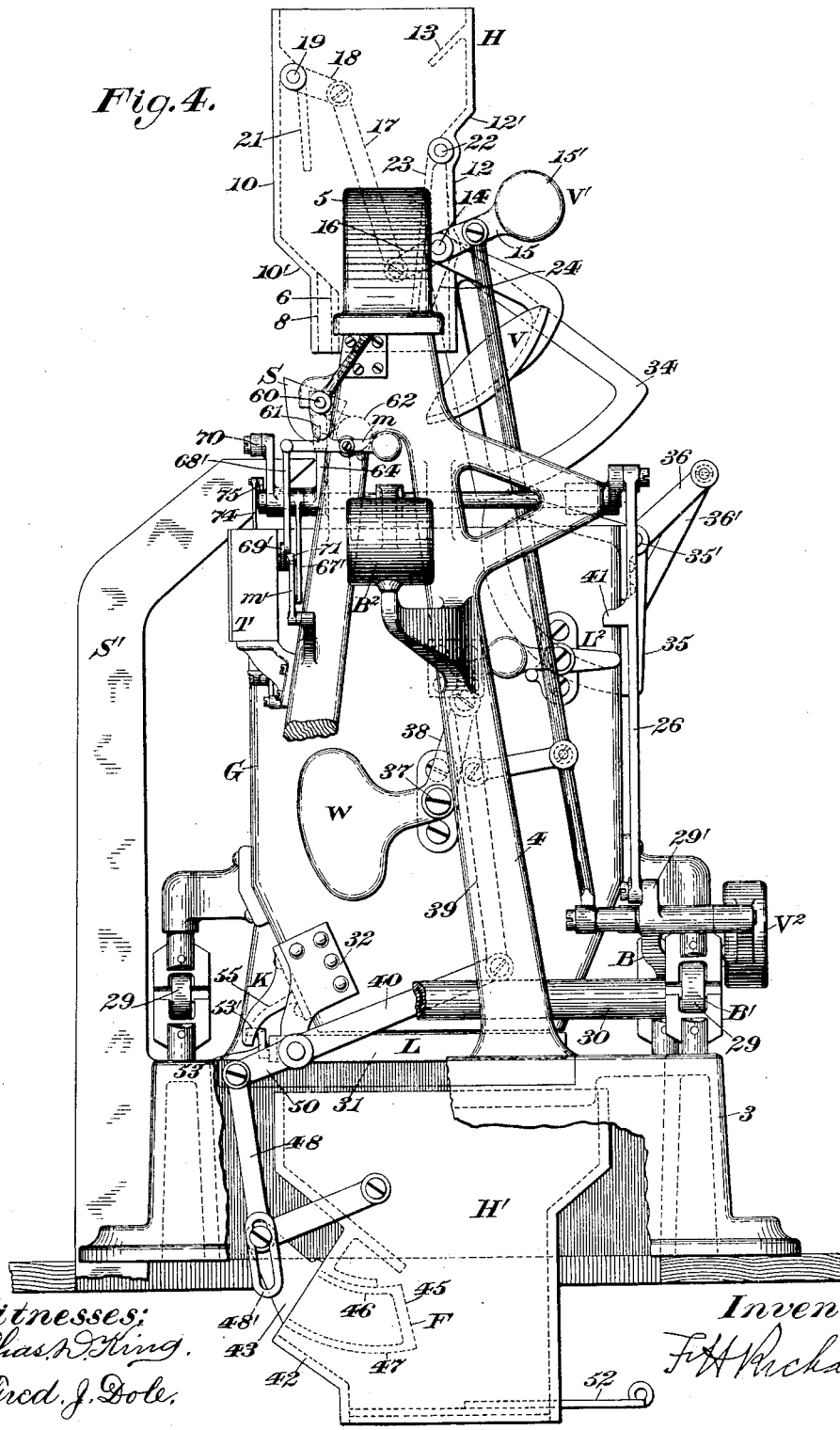
Figure 5:
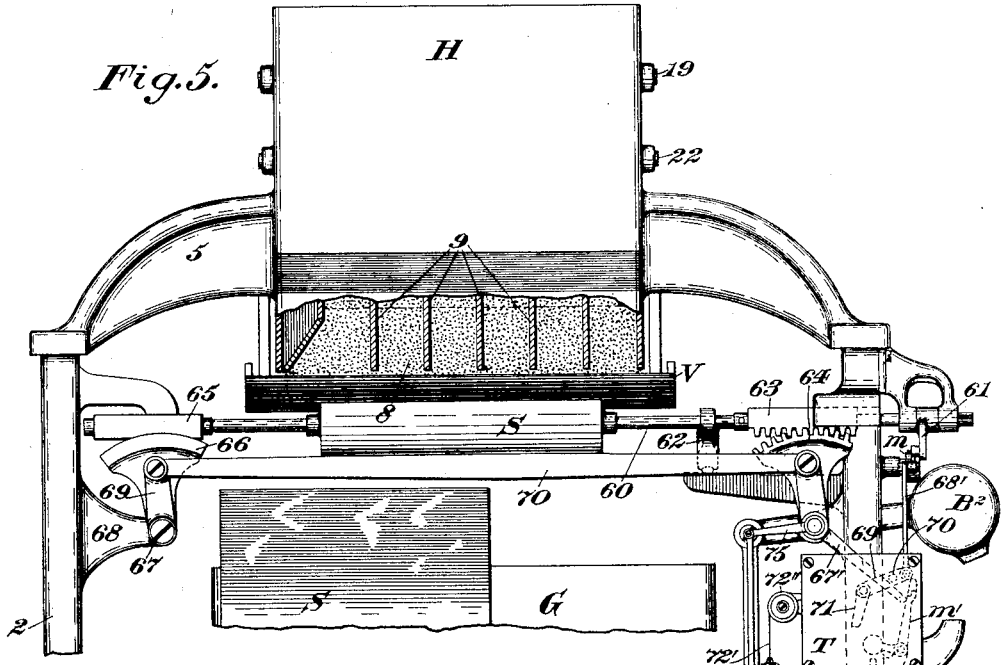
Figure 6:
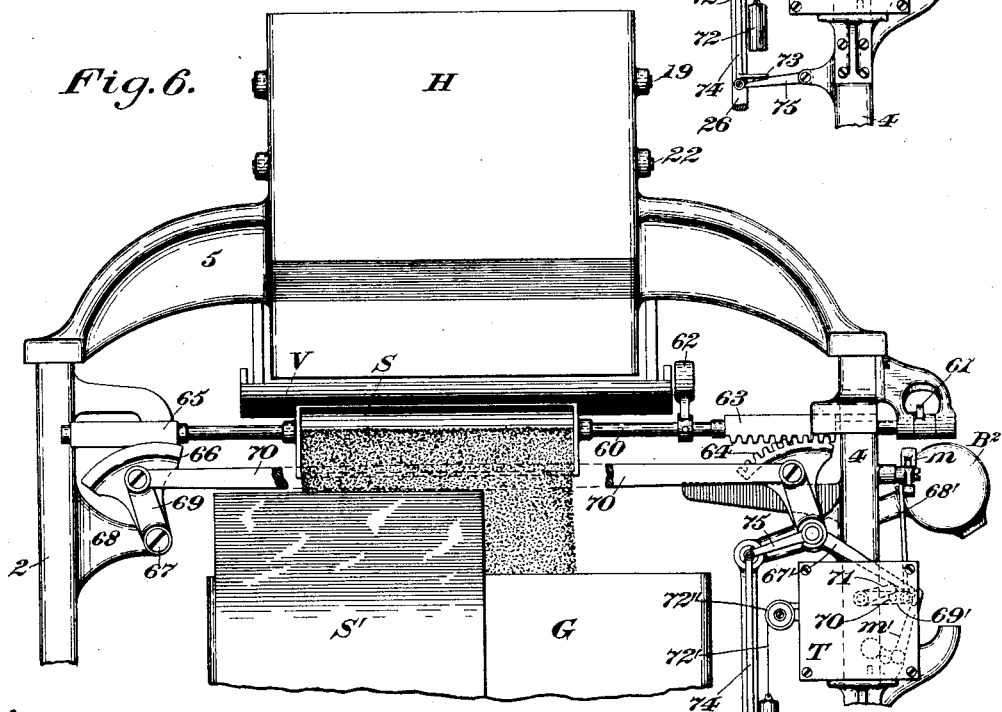
Figure 10:
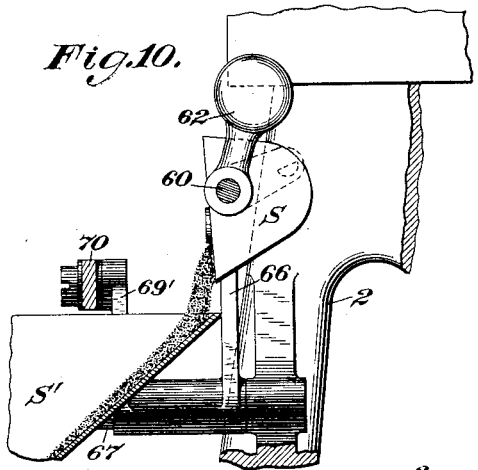
Figure 11:
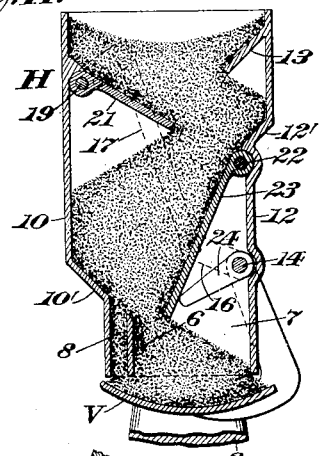
Figure 12:
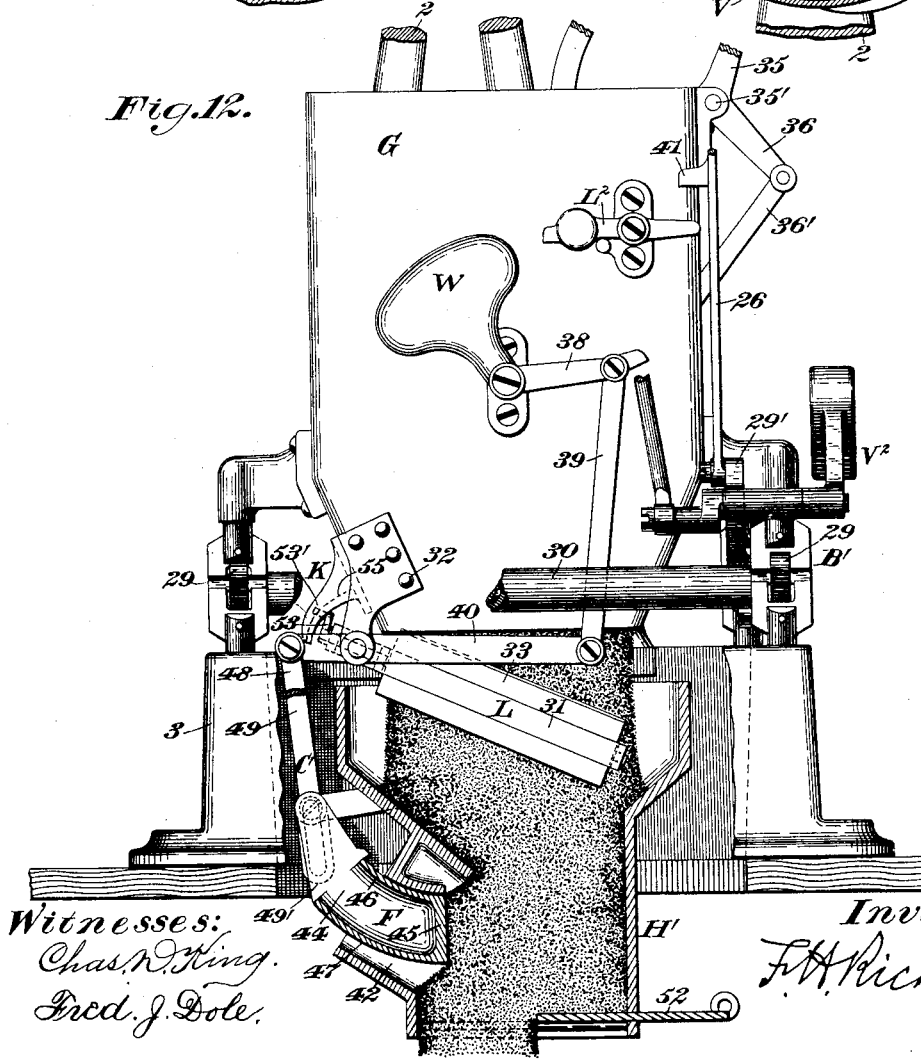
Figure 13:
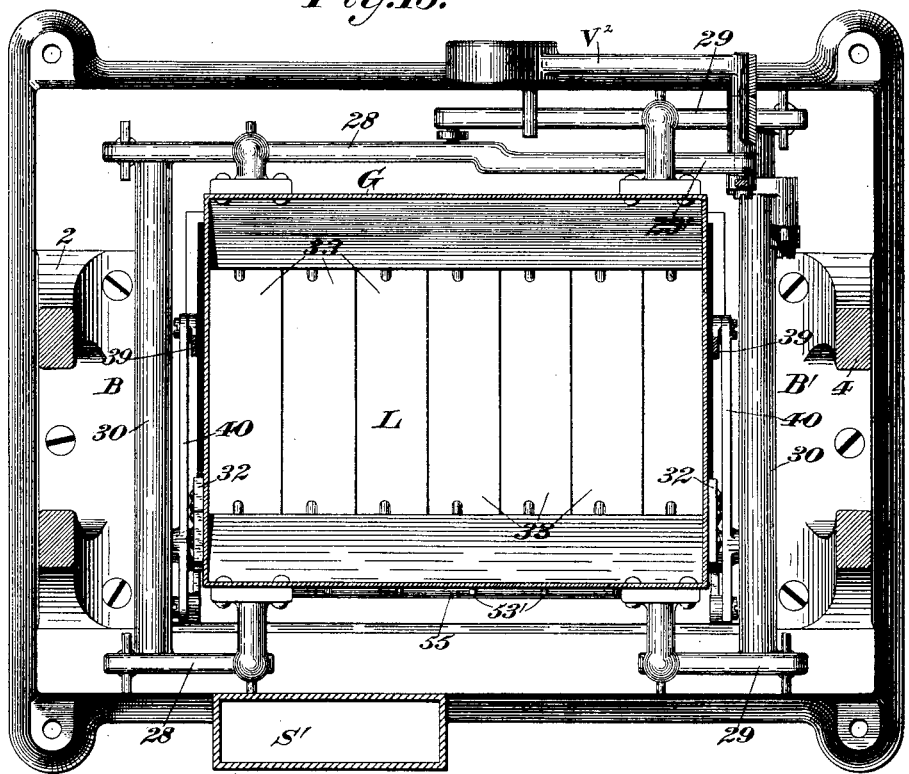
Figure 14:
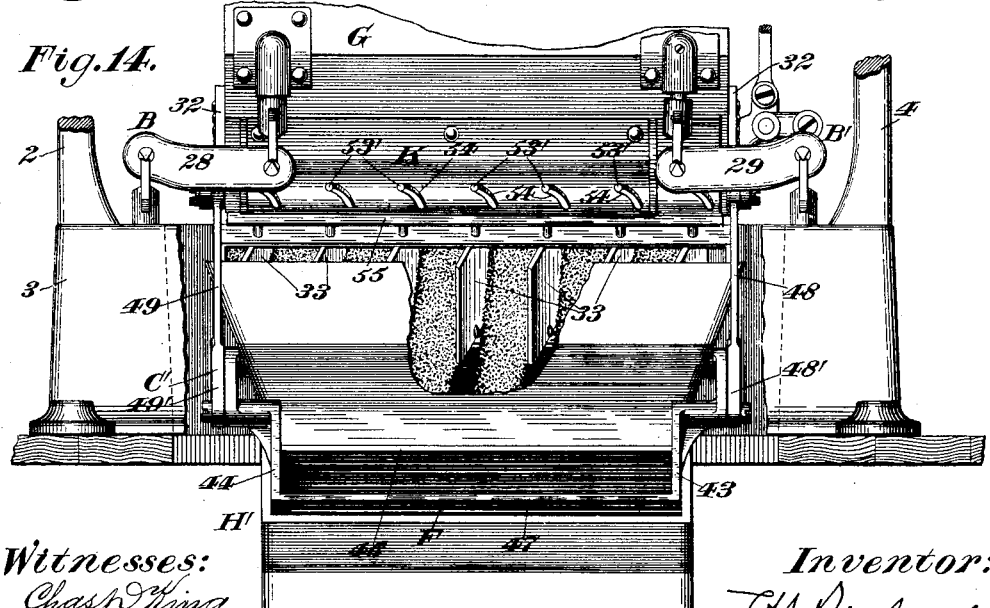
Figure 15:
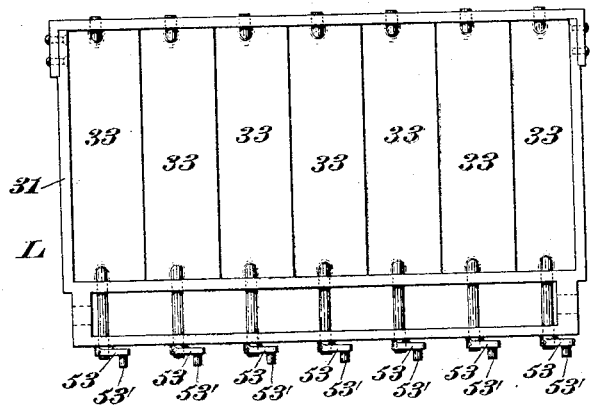
Figure 16:
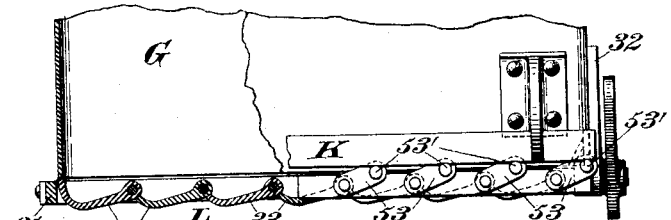
Figure 17:
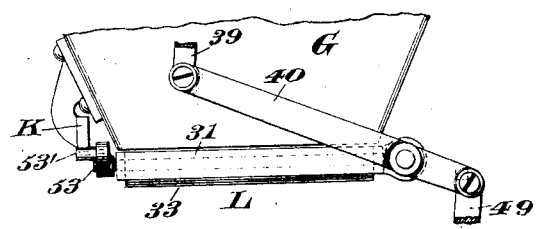

In the drawings accompanying and forming part of this specification, Figure 1 is a front elevation, partially in section, of a weighing-machine embodying my present invention, the parts being shown in the positions they occupy during the supply of material from the main supply apparatus to the load-receiver. Fig. 2 is a rear elevation of the machine, showing the parts in positions illustrated in Fig. 1. Fig. 3 is a side elevation, partially in section, of the weighing-machine as seen from the left in Fig. 1, the parts being shown in their normal positions. Fig. 4 is a similar side elevation of the weighing-machine as seen from the right in Fig. 1. Fig. 5 is a front elevation of a portion of the upper part of the machine, showing the stream-controller or valve of the main supply apparatus in its closed position and the auxiliary supply device or load-completer and its actuating instrumentalities in the positions they occupy just after an approximate load has been made up in the load-receiver and preparatory to a discharging movement of the auxiliary supply device for completing the load, a portion of the supply-chute being broken away to show the several compartments of the drip-conduit. Fig. 6 is a view similar to Fig. 5, parts being broken away, and showing the auxiliary supply device tilted to complete the load in the load-receiver. Fig. 7 is a front elevation, partially in section, of a portion of the weighing-machine, showing the load-completer in its fully-retracted position and also showing the time-train that controls the load-discharge movement of said load-completer. Fig. 8 is a side elevation of the parts of the weighing-machine illustrated in Fig. 7, as seen from the right in said figure. Fig. 9 is a cross-sectional view of a portion of the time-train, said section being taken on a line corresponding with the dotted line $a\ a$, Fig. 7. Fig. 10 is a sectional side elevation of a portion of the upper part of the weighing-machine, showing the load-completer in its load-discharging position and also showing the entrant end of the discharge-chute located below and in position to receive a portion of the material from the load-completer on the discharging movement thereof. Fig. 11 is a longitudinal section of a portion of the main supply apparatus, showing the valve in its closed position and also showing the shiftable break-walls, which are actuated by said valve, in position for "cramping" and deflecting the stream of material in the supply-chute. Fig. 12 is a side elevation of a portion of the lower part of the weighing-machine, partially in section, as seen from the right in Fig. 1 and showing the load-receiver in its depressed position and also showing the closer in its discharging position and the float in connection with said closer in position for blocking the return movement thereof. Fig. 13 is a horizontal cross-section of the weighing-machine, taken on a line corresponding with the dotted line $b$ $b$, Fig. 1, as seen from above in said figure, the closer of the load-receiver being shown in an elevated position with the blades thereof closed. Fig. 14 is a front elevation, similar to Fig. 1, of a portion of the lower end of the machine as seen from the left in Fig. 12 and showing the closer with its closer-blades in the positions illustrated in said Fig. 12. Fig. 15 is a plan view of the closer detached. Fig. 16 is a sectional front elevation of a portion of the load-receiver, showing a slightly-modified form of closer and closer-blade-actuating device in connection therewith; and Fig. 17 is a side elevation of the parts illustrated in Fig. 16, as seen from the right in said figure.

Similar characters designate like parts in all the figures of the drawings.

The framework of the machine may be of any suitable general construction adapted for supporting the several parts, and it is shown in the drawings as consisting of the side frames 2 and 4, mounted upon the chambered supporting-base 3, which are connected together at their upper ends by the top plate 5 and supply chute or hopper H, which preferably constitutes a part of said top plate.

The supply-chute H, which constitutes one of the elements of the main supply apparatus and which may be of any suitable general construction, is shown divided, at the lower end thereof, by means of a vertical partition or break-wall 6 into a main and a drip conduit, (designated by 7 and 8, respectively,) the former of which is materially of greater area, for obvious reasons, than the latter, and the latter of which is divided transversely by vertical partitions or break-walls 9 into a series of drip-compartments or passage-ways.

As shown most clearly in Fig. 11 of the drawings, the front wall 10 has an inclined inwardly-projecting portion 10', which constitutes a deflecting-wall for the material, said wall terminating at its inner end at a point just above and in juxtaposition to the partitions of the drip-conduit 8, and the rear wall 12 is shown as having a similar offset portion 12', located considerably above the offset portion 10' of the said wall, and also has a fixed inwardly and downwardly projecting break wall or plate 13, located above the offset portion 12'. The functions of these fixed break-walls or inclined offset portions are well known in the art, and therefore a more detailed description thereof may be dispensed with.

The valve or stream-controller, which is designated in a general way by V, and which may be of any suitable or well-known construction, it constituting another element of the main supply apparatus, is shown fixed to a rock-shaft 14, journaled at its opposite ends in suitable bearings on the top plate 5, it preferably extending through the supply-chute H, as shown in Figs. 1, 2, and 11.

Fixed to the rock-shaft 14, near one end thereof, is a counterweighted valve-closing actuator (designated in a general way by V') consisting of a crank-arm 15, having a counterweight 15' at the outer end thereof, and fixed to said rock-shaft at a point preferably intermediate its bearings is a crank-arm 16, which projects inward toward the center of the chute H, and is pivotally connected at the free end thereof, by means of a link 17, to an inwardly-projecting crank-arm 18, fixed to a rock-shaft 19, extending through and journaled in bearings in the side walls of the chute H, contiguous to the front wall, near the upper end thereof, these crank-arms 16 and 18 and the link 17 constituting, in connection with the rock-shaft of the valve V, an actuator for a shiftable break-wall 21, fixed to the upper rock-shaft 19, said break-wall extending inward toward the vertical axis of the supply-chute H and being adapted, on the closing movement of the valve, to have a stream reducing or cramping movement.

Journaled in bearings on the side walls of the chute H, contiguous to the rear wall thereof and below the horizontal plane of the rock-shaft 19, is a similar rock-shaft 22, to which is fixed an inwardly-projecting break-wall 23, which is oppositely disposed relatively to and coöperates with the break-wall 21 for deflecting the stream and reducing the volume thereof as the same flows through the chute H during the closing movement of the valve V.

As a convenient means for actuating the lower break-wall 23 I have provided a break-wall actuator 24, (shown in the nature of a crank-arm,) fixed to the rock-shaft 14 below and in position to engage the lower break-wall 23 to impart an upward movement thereto during the closing movement of the valve, said crank-arm being shown located within the chute H.

The means for imparting an opening movement to the valve will be hereinafter described.

The load-receiver, which is designated in a general way by G, and which in the present instance is shown as a "single-chambered" bucket, is supported for vertical reciprocatory movements on suitable beam mechanism, which in the present instance comprises two supporting-beams (designated in a general way by B and B') connected together at 25 for unitary oscillatory movements, and a counterweighted beam $B^2$, (shown pivotally supported on and near the upper end of one of the side frames, as 4,) pivotally connected, by means of a link or rod 26, to an extension 29' on one of the supporting scale-beams, as B. Each scale-beam B and B' comprises, in the preferred form shown most clearly in Figs. 1, 2, and 13 of the drawings, two inwardly-projecting beam-arms 28 and 29, respectively, connected together near their outer ends by a cross-bar 30. One of the beam-arms, as 29, of one beam, as B, is shown as having an extension 29', which terminates at its inner end in close proximity to the axis of movement of the other scale-beam B', and this extension, as before stated, is connected to the counterweighted beam $B^2$, which is intended to counterbalance the entire beam mechanism. The two beams B and B' are shown pivotally supported at their outer ends on V-shaped bearings on the base 3 of the framework, and the load-receiver is shown furnished near the corners thereof with depending bearings, which are supported on knife-edges on the inner ends of the beam-arms 28 and 29 of the beams B and B' in the usual manner of supporting load-receivers in machines of this class.

As a means for actuating the stream-controller or valve V to impart an opening movement thereto I have provided a valve-opening actuator, (designated in a general way by $V^2$,) comprising a counterweighted auxiliary beam or lever (shown pivotally supported intermediate its non-counterweighted and counterweighted ends on the extension 29' of one of the beam-arms) and a thrust-rod supported at its lower end on the non-counterweighted end of said lever and pivotally connected at its upper end to the valve-closing actuator V', this organization of mechanism being somewhat similar in a general way to the valve-opening actuator described in Letters Patent of the United States No. 548,840, granted to me October 28, 1895.

For the purpose of controlling the discharge of material from the load-receiver I have provided in operative relation with the discharge-opening of said receiver a closer, (designated in a general way by L,) which is shown in the nature of a so-called "gang-closer," it consisting of a closer-blade carrier or frame 31, pivotally supported, for oscillatory movement in a vertical direction to open and close the discharge-outlet of the load-receiver, on a bracket 32, which is shown secured to the load-receiver, and a series of independent closer-blades, each of which is designated by 33, pivotally supported on the carrier 31 for rotative movements in relatively different arcs.

In the form thereof shown in the drawings the closer-blades are supported on the carrier with their axes intersecting the axis of movement of said carrier, so that during the discharge of the load from the load-receiver said closer-blade will have a unitary oscillatory movement in one direction and in the same arc, and will have independent rotative movements in different arcs and in a direction transverse to the direction of unitary movement of said blades; but it will be understood that the organization and arrangement of closer-blades with relation to the carrier may be modified without departure from this invention.

For the purpose of preventing the discharge of the load from the load-receiver while the valve V is open and also for maintaining said valve in its closed position while the closer is open I have provided, in connection with the valve and closer, reciprocally effective stops or interlocking devices, which in the construction and organization thereof shown in the drawings comprise two coöperative and reciprocally effective stop members, (designated by 34 and 35, respectively,) one of which is carried by the rock-shaft of the valve V for movement in unison with said valve and the other of which is fixed to a counterweighted rock-shaft 35', journaled in a bracket on the load-receiver, near the upper end thereof, a crank-arm 36, fixed to said rock-shaft 35', a rock-shaft 37, shown extending through the load-receiver and journaled in the side walls thereof and having at one end thereof a crank-arm 37', which is pivotally connected at its outer end to the crank-arm 36 on the stop-member rock-shaft 35' by a link 36', a catch-arm 38, fixed to said rock-shaft 37 and adapted, when the valve is in its open position and the stop member 34 is in position for blocking the movement of the stop member 35, to engage a gravitative latch $L^2$, and two pivotally-connected links 39 and 40, the one 39 of which is shown pivotally connected at its upper end to the catch-arm 38 on the rock-shaft 37, and the other one 40 of which is shown fixed to the pivot of the closer-blade carrier. (Shown most clearly in Figs. 1, 2, and 12 of the drawings.)

For the purpose of returning the closer to its normally closed position and for normally retaining the stop member 35 and its connections in the positions shown in Fig. 3 the rock-shaft 37 is shown furnished with a counterweighted arm W.

For the purpose of actuating the latch at a predetermined point in the descending movement of the load-receiver and beam mechanism the link 26, which connects the beam-arm extension 29' of the beam B to the counterweighted beam $B^2$, is furnished with a projection 41, which is located in position to engage the non-counterweighted end of the latch and release the opposite end thereof from engagement with the catch-arm on the counterweighted rock-shaft 37.

The operation of the interlocking mechanism which controls the movements of the valve V and closer being very similar to the operation of like mechanism described in the patent hereinbefore referred to will be readily understood by a comparison of the several figures of the accompanying drawings.

As a means for preventing a return movement of the closer until the load is completely discharged from the load-receiver and has passed below said closer I have provided an improved regulating apparatus, which, in the preferred form thereof shown most clearly in Figs. 3 and 12 of the drawings, comprises a regulator-hopper (designated in a general way by H') having its entrant end located below and in vertical alinement with the discharge-opening of the load-receiver, a float (designated in a general way by F) supported for movement toward and away from the vertical axis of the regulator-hopper, and an actuating-connector (designated by C') operatively connecting the float and closer in such manner that when material is flowing through the regulator-hopper said material will force the float outwardly into a position for blocking the closer-shutting movement of the actuating-connector, as will be understood by a comparison of said Figs. 2 and 12.

In the organization of regulating apparatus shown in the drawings the regulator-hopper has at one side the axis thereof a guideway or passage-way 42 for the float F. This float, which may be of any suitable general conformation, is shown consisting of two curved side plates 43 and 44, respectively, connected together at their inner ends by an end wall 45 and curved top and bottom plates 46 and 47, respectively.

The connection between the closer and float is shown consisting of two vertically-disposed links 48 and 49, pivotally connected at their upper ends to two crank-arms 50 and 51, respectively fixed to the pivots of the closer-blade carrier 31, and which links 48 and 49 have at their lower ends elongated loops 48' and 49', respectively engaging pins on the outer ends of the plates 43 and 44 of the float F, said loops permitting a limited movement of the float inward and outward when the closer is in its open or closed position, respectively.

As will be seen by reference to Fig. 12 of the drawings, the upper walls of the loops bear against the pins on the float when the closer is open, and the float is forced backward by the material in the regulator-hopper, which prevents the return movement of the closer until the material has passed below said float and the float is allowed to move inward toward the position shown in Fig. 2 of the drawings. After the material has passed below the inner end of the float F and said float is left free to move inward the counterweighted crank-arm W of the rock-shaft 37 will immediately act to impart a closing movement to the closer, as will be readily understood by comparison of Figs. 12 and 3 of the drawings.

For the purpose of regulating the outflow of material through the regulator-hopper, and for the purpose of insuring the retention of sufficient material in said hopper during the discharge of the load-receiver to retain the float in position to prevent a premature closing movement of the closer, I have shown, in connection with the discharge end of the regulator, a cut-off blade or gate 52, which is supported for horizontal adjustment and is adapted, when adjusted to different positions, for increasing or decreasing the effective area of the discharge-opening of said regulator.

For the purpose of actuating the closer-blades 33 to impart or facilitate an opening movement of said closer-blades simultaneously with the descending or discharge movement of the closer proper I have provided, in connection with the pivot or axis of each blade, as shown in Figs. 1, 2, and 12 of the drawings, a crank or crank-arm 53, having an outwardly-extending pin 53' at the outer end thereof, and have also provided, in connection with the load-receiver, a crank-actuator (designated in a general way by K) adapted, on the return movement of the closer, for actuating the cranks to shut the closer-blades.

In the drawings I have for convenience shown two slightly-modified forms of actuating devices for the closer-blades; and it is desired to state in this connection that the invention is not limited to any particular construction or organization of devices for effecting an opening and closing movement of the closer-blades, and these may be variously modified without departure from my present invention.

In Figs. 3, 4, and 12 of the drawings the closer-blade-actuating cranks are shown fixed to the closer-blades at the rear ends thereof, whereas in Figs. 16 and 17 said cranks are shown fixed to the closer-blades at the front ends, and in the construction illustrated in Figs. 1, 3, and 14 the cranks are shown in full and dotted lines, having their outer ends projecting through cam-grooves 54 in a cam-plate 55, fixed to the load-receiver adjacent to the axis of vertical oscillation of the closer-blade carrier, the walls of said cam-grooves being so disposed as to positively impart an opening and closing movement to the closer-blades simultaneously with the downward and upward movement, respectively, of the closer-blade carrier, whereas in Figs. 16 and 17 the crank-actuator K is shown in the nature of a plate fixed to the rear wall of the load-receiver in position to strike the end of and impart a blade-closing movement to the cranks at the last stage of the upward movement of the closer-blade carrier, said plate holding the cranks against accidental movement when the closer is in its closed position and permitting a blade-opening movement of said cranks immediately upon the release of said closer, as will be readily understood by reference to said Figs. 16 and 17.

The cam-plate 55, which constitutes the crank-actuator in the organization shown in Fig. 2 of the drawings, is curved to correspond to the arc described by the outer ends of the closer-blade cranks during the vertical oscillation of the closer-carrier, and the cam-faces are so disposed as to gradually impart an opening-and-closing movement to the closer-blades on their independent axes and proportionate to the descending and ascending movement of said closer-blade carrier.

From the foregoing description it will be seen that the closer-blades are supported to have a unitary movement in the same arc about a common axis and to have independent movements in different arcs about their independent axes, the construction and organization of the parts of the closer and its actuating devices being such as to facilitate a rapid discharge of the contents of the load-receiver.

The closer-blades are shown in dotted lines in Fig. 1 and in full lines in Fig. 13 so organized that the side edges of adjacent blades are in overlapping relation when said blades are in their closed positions, the axes of rotative movement of these blades being shown substantially midway between the opposite side edges thereof, whereas in Fig. 16 the closer-blades are shown pivoted near their extreme outer edges, the free side edge of one blade being located below the pivoted edge of the next adjacent blade.

In the operation of the machine the valve V and valve-controlling devices are so constructed and organized and are so timed in their movements relatively to the movements of the beam mechanism that they will be actuated to cut off the supply of material from the main supply apparatus to the load-receiver before the beam mechanism has arrived at a position to effect a release of the closer through the medium of the latch-actuating device, hereinbefore described, it being intended to cut off the main supply to the load-receiver after a predetermined quantity or weight of material constituting an approximate load or rough load has been supplied thereto, and for the purpose of supplying the additional quantity necessary to make up a true load of accurate weight I have provided load-completing instrumentalities controlled by the beam mechanism and effective, on the ascending and descending movements of the load-receiver, for supplying a greater or lesser quantity, pro rata, to said load-receiver according to the requirements, as indicated by the position of said receiver relatively to a true poising position.

The load-completing device or auxiliary supply device, which is designated in a general way by S in the form thereof shown most clearly in Figs. 1 to 8, inclusive, of the drawings, is in the nature of an oblong receptacle, which is shown similar, except as to the length, to an ordinary conveyer-bucket, and is fixed to a horizontally-disposed rock-shaft 60, supported at opposite ends thereof in suitable bearings for longitudinal reciprocatory movement as well as rotative movement. This load-completer is shown located below and in position to be supplied from the drip-conduit of the main supply apparatus, the axis of rotative movement of the load-completer being located at one side of the center of gravity and in position to facilitate the tilting movement of the load-completer when filled, said axis being shown located in close proximity to the upper edge of said load-completer.

As will be understood by reference to Fig. 8 of the drawings, the preponderance of material delivered to the load-completer from the drip-conduit will be contained in the load-completer in advance of the axis of rotative movement of said load-completer. As a means for holding said completer against accidental discharging movement, due to the preponderance of weight located at one side its axis of movement, I have provided in connection therewith latch mechanism which in the form thereof shown comprises a catch-arm 61, fixed to the rock-shaft 60, and a counterweighted latch $m$, pivotally supported on the framework and having a projection for normally engaging the catch-arm 61 and holding the rock-shaft against accidental rotative movement.

As a means for returning the load-completer to its normal load-receiving position after the contents thereof have been discharged the rock-shaft 60 is provided with a counterweighted arm 62, having sufficient resistance to overcome the tilting resistance of the empty load-completer, but not of sufficient resistance to prevent a tilting movement of said completer when filled. This load-completer is filled from the drip-conduit of the main supply-chute H during the supply of material from said chute to the load-receiver, a predetermined amount of material being supplied to said load-completer each time an approximate load is supplied by the main supply apparatus to the load-receiver.

In contradistinction to the usual operation of valves which operate to supply a continuous stream of gradually-reduced volume to the load-receiver the load-completer in the present instance is intended to deliver at each operation thereof a "charge" to the load-receiver of greater or lesser weight, according to the requirements for making up a true load, as determined by the position of said load-receiver relatively to a true poising position, and said load-receiver is intended to be advanced and retracted in a horizontal direction, so that a greater or lesser area of said completer will be located above the entrant end of said receiver, and so that a portion of the contents of the load-completer will be discharged into the load-receiver and another portion thereof will be simultaneously discharged outside of said load-receiver.

As a convenient means for conducting the surplus of material not needed for completing the load away from the load-receiver I have provided a vertically-disposed discharge-chute S', (shown located in the rear of the load-receiver with its entrant end over the entrant end of the load-receiver and in position to receive a portion of the contents of the load-completer on the discharge movement thereof,) one wall of the discharge-chute constituting a dividing-partition for separating the supply into two charges, one of which constitutes the completing charge and is delivered from the load-completer into a load-receiver, and the other of which constitutes the surplus charge and is delivered into the discharge-chute S' and is conducted thereby to a suitable place of deposit.

To supply the requisite amount of material to the load-receiver by the load-completer after an approximate or rough load has been supplied to said load-receiver, it is absolutely essential that the load-completer shall have advancing and retracting movements crosswise of the entrant ends of the load-receiver and discharge-chute, coincident with and in exact proportion to the ascending and descending movement of said load-receiver relatively to a given point—that is to say, on the successive descending movements of the load-receiver the load-completer shall have corresponding or proportionate movements, so as to successively decrease the effective area thereof located above the receiver and deliver a smaller charge to the load-receiver, in accordance with the requirements as determined by the position of the load-receiver relatively to a given point; and on the ascending movements of said load-receiver the load-completer shall move to successive advancing positions relatively to the load-receiver, in accordance with the successive ascending positions of the load-receiver, to supply a larger charge to said load-receiver, as needed to complete the load when the load-receiver is in the more elevated position.

As a means for imparting reciprocatory movements to the load-completer and maintain a predetermined ratio of movement between said load-completer and the load-receiver I have provided actuating instrumentalities operatively connecting the load-completer and beam mechanism and effective on the ascending and advancing movement of the load-receiver for shifting the load-completer inward and outward distances proportionate to the distances traversed by the load-receiver to bring a greater or lesser area of the load-completer into operative relation with the entrant end of said receiver, whereby on the discharge movement of said load-completer a charge of greater or lesser weight will be delivered to the load-receiver in accordance with the requirements as indicated by the position of said receiver relatively to a true poising position. These instrumentalities in the preferred form shown most clearly in Figs. 1, 5, 6, 7, and 8 of the drawings comprise a rack 63, mounted on the rock-shaft 60 of the load-completer, and a segment-gear 64, meshing with said rack and fixed to the beam $B^2$ of the beam mechanism, with its axis coincident with the axis of movement of said beam. This rack 63 is loosely mounted upon the rock-shaft 60 and is supported against rotative movement with said rock-shaft in a bearing fixed to the framing of the machine, it being held against longitudinal movement relatively to the rock-shaft by any suitable device, such as a collar. The opposite end of the rock-shaft 60 is preferably journaled in a block 65, supported on the rim of a friction-segment fixed to a rock-shaft 67, journaled in a bracket 68 on the framework, and having a crank-arm 69 connected at its upper end by means of a strap or bar 70 to the outer end of a similar crank-arm fixed to the rock-shaft or pivot of the beam $B^2$ of the beam mechanism, the segment 66 having a movement corresponding to the movement of a segment-gear 64.

It will be obvious that the construction and organization of devices for reciprocating the load-completer may be variously modified without departure from this invention.

With the organization of mechanism hereinbefore described it is desirable that a sufficient length of time shall elapse after the approximate load has been made up in the load-receiver before a discharge movement is imparted to the load-completer or auxiliary supply device to complete the load, so that the load-receiver and load-completer may have sufficient time to oscillate and come to a rest before a discharge movement is imparted to said load-completer, thereby preventing an over or under quantity of material being supplied to the load-receiver by the changes in positions of the load-completer during a discharge movement thereof.

As a means for effecting a load-discharge movement of the load-completer at the expiration of a predetermined length of time after the supply of material has been cut off from the main supply apparatus to said load-receiver I have provided means, including a time-train (designated in a general way by T) actuated by the beam mechanism, for controlling the load-discharge movement of the load-completer. This time-train, which may be of any suitable general construction and organization, comprises a train of gears; means controlled by the beam mechanism on the descending movement of the load-receiver for actuating the train of gears; a latch device (designated in a general way by $m'$) for normally locking the time-train against movement; a time-train-latch-actuating arm 67', carried by a member of the beam $B^2$ and adapted on the descending movement of the beam for releasing the latch to start the time-train; a load-completer-latch-actuating device, shown comprising a link 68' and an arm 69', the former of which is pivotally connected at its upper end to the load-completer latch $m$ and at its lower end to the arm 69', which arm 69' is furnished with a pin 70, located in the path of movement of a catch-arm 71, rotating with one of the gears of the time-train, and which arm is adapted for engaging the pin of the arm 69' at a predetermined point in the rotative movement of the time-train to release the latch $m$ from engagement with the catch-arm on the load-completer shaft and facilitate a load-discharge movement of said load-completer.

In the form of time-train device shown most clearly in Figs. 7 to 9, inclusive, of the drawings the actuator comprises a weight 72, having a cord 72', extending over a drum 72'', fixed to the arbor of the master-wheel, said weight being supported, when the beam is in its elevated position, on a shelf or bracket 73 of a parallel linkage comprising a vertically-disposed link 74 and two horizontally-disposed links 75, one of which is connected at its outer end to the upper end of link 74 and at its inner end to the axis of the beam mechanism, and the other of which is pivotally connected at its outer end to the lower end of link 74 and at its inner end to a bracket on the framework of the machine.

During the descending movement of the beam mechanism the bracket on which the weight is normally supported will descend and leave the weight unsupported in its elevated position, where it remains until the beam $B^2$ has moved through a sufficient arc to cause the arm 67' to engage and release the latch $m'$, after which the weight will descend and rotate the time-train until the catch-arm 71 engages and actuates the device on said latch-releaser, which releases the latch $m$ of the load-completer and effects a load-discharge movement of said completer. On the descending movement of the beam mechanism the weight 72 will be carried upward, and as a means for winding the time-train I have provided an ordinary winding-spring in connection with the arbor of the master-wheel of sufficient stress to wind said time-train when the normally overcoming resistance of the weight 72 is rendered ineffective by the lifting of the weight from its lowermost to its uppermost position on the shelf or table 73 during the ascending movement of the load-receiver and beam mechanism.

Having described my invention, I claim—

1. In a weighing-machine, the combination, with a main supply apparatus, of a reciprocatory load-receiver and a reciprocatory auxiliary supply device connected together and having, during the weighing operation, concurrent movements of predetermined ratio in relatively-intersecting planes.

2. In a weighing-machine, the combination of a reciprocatory load-receiver and a reciprocatory supply device movable concurrently in relatively-intersecting planes; means connecting, and maintaining a predetermined ratio of movement between, said load-receiver and supply device; and means for imparting a discharge movement to the supply device at a predetermined point in the movements of the load-receiver.

3. The combination, with a vertically-reciprocatory load-receiver and with a main supply apparatus, of an auxiliary supply device supported between the load-receiver and main supply apparatus for horizontal reciprocatory movements concurrently with the vertically-reciprocatory movements of the load-receiver and for independent oscillatory movements.

4. The combination, in a weighing-machine, of a vertically-reciprocatory load-receiver; a main supply apparatus located above said receiver; a horizontally-adjustable load-completer interposed between the load-receiver and the main supply apparatus; an actuating-connector between the load-receiver and load-completer and effective, on the ascending and descending movement of said load-receiver, for adjusting the load-completer to positions for discharging a greater or lesser portion of its mass into and outside of the load-receiver according to the position of said load-receiver relatively to a given point; and means for imparting a load-discharging movement to the load-completer at a predetermined point in the movement of the load-receiver.

5. The combination, with a vertically-reciprocatory load-receiver and with a supply-chute having a main outlet and a drip-outlet, of a valve shiftable across the main and drip outlets; means for actuating said valve; an oscillatory load-completer located below, and in position to be filled from, the drip-outlet; means controlled by the load-receiver, for shifting the load-completer horizontally in one direction concurrently with and in proportion to the descending movement of the load-receiver and in an opposite direction concurrently with and in proportion to the ascending movement of said load-receiver; and means for imparting a load-discharging movement to said load-completer at a predetermined point in the movement of the load-receiver.

6. The combination, with weighing mechanism including a load-receiver, of a main supply apparatus including a valve; means for actuating the valve; an auxiliary supply device; means controlled by the weighing mechanism, for shifting the auxiliary supply device bodily crosswise of the load-receiver during the closing movement of the valve; and means for effecting a tilting load-discharge movement of said auxiliary supply device subsequent to the complete closure of said valve.

7. The combination, with a vertically-reciprocatory load-receiver and with a discharge-chute, of stream-supplying means for supplying an approximate load to the load-receiver; an oscillatory auxiliary supply device supported above the entrant ends of the load-receiver and discharge-chute and movable independent of its oscillatory movement crosswise of said load-receiver and discharge-chute in proportion to and in accordance with the vertical movements of the load-receiver relatively to a given point.

8. The combination, with a vertically-reciprocatory load-receiver and with a discharge-chute, of stream-supplying means adapted for supplying an approximate load to the load-receiver; an auxiliary supply device supported above and movable in a horizontal direction crosswise of said load-receiver and discharge-chute in accordance with and in proportion to the vertical movements of the load-receiver relatively to a given point, to vary the volume of material delivered from the auxiliary supply device to the load-receiver in proportion to the requirements, as indicated by the position of said load-receiver with respect to a true poising position; and means for imparting a load-discharge movement to said auxiliary supply device.

9. The combination, with a reciprocatory load-receiver and a discharge-chute, of a main supply apparatus operative for supplying an approximate load to the load-receiver; an auxiliary supply device supported above and shiftable in one direction crosswise of the entrant ends of the load-receiver and discharge-chute on the descent of said load-receiver beyond a predetermined point and shiftable in an opposite direction on the ascent of the load-receiver beyond a predetermined point; and means for imparting a load-discharge movement to the auxiliary supply device, to empty a portion of the contents thereof into the load-receiver and a portion into the discharge-chute and thereby complete the load.

10. The combination, with beam mechanism and with a load-receiver supported thereon, of a discharge-chute having the entrant end thereof located above and intersecting a portion of the entrant end of the load-receiver; a main supply apparatus controlled by the beam mechanism, for supplying an approximate load to the load-receiver; an auxiliary supply device shiftably supported above the entrant ends of the load-receiver and discharge-chute; and means controlled by the beam mechanism, for shifting the auxiliary supply device crosswise of the entrant ends of said load-receiver and discharge-chute in opposite directions on opposite movements, respectively, of the load-receiver, to thereby bring greater or less areas of said auxiliary device over the entrant end of the discharge-chute according to the position of the load-receiver with respect to a poising-point; and means controlled by the beam mechanism, for tilting the auxiliary supply device to thereby complete the load in the load-receiver and discharge the surplus material into the discharge-chute.

11. The combination, with weighing mechanism including a vertically-reciprocatory load-receiver and with a discharge-chute, of a main supply apparatus located above the receiver; means controlled by the weighing mechanism, for cutting off the supply of material from the main supply apparatus to the load-receiver before the load-receiver arrives at its poising position; an auxiliary supply device located between the load-receiver and main supply apparatus; means controlled by the weighing mechanism, for advancing and retracting the auxiliary supply device concurrently with and in proportion to the upward and downward movements, respectively, of the load-receiver; and means operative subsequent to the cutting off of the supply from the main supply apparatus, for imparting a load-discharge movement to the auxiliary supply device.

12. The combination, with weighing mechanism including a vertically-reciprocatory load-receiver and with a discharge-chute having its entrant end adjacent to the entrant end of said receiver; of means governed by the weighing mechanism, for supplying an approximate load to the load-receiver; a load-completing device controlled by the weighing mechanism and shiftable, on the descent of the load-receiver, toward and over the entrant end of the discharge-chute, and shiftable, on the ascent of said load-receiver in the opposite direction, to vary the volume of additional material supplied to the load-receiver by the load-completing device in proportion to the requirements as determined by the position of said load-receiver relatively to a given point; and means for tilting the load-completing device on the arrival of the load-receiver at a predetermined position.

13. The combination, with beam mechanism and with a vertically-reciprocatory load-receiver carried thereby, of a surplus-discharger located with its entrant end adjacent to the entrant end of the receiver; a main supply apparatus controlled by the weighing mechanism, for supplying an approximate load to the load-receiver; an auxiliary supply device governed by the weighing mechanism and having a progressively-advancing horizontal movement over the entrant end of the discharge-chute on the descent of the load-receiver, and a progressive retractive movement on the ascent of the load-receiver; and means for tilting the auxiliary supply device, to deliver material to the load-receiver and supply-chute in proper proportion as determined by the position of the load-receiver, to make up a true load in said receiver.

14. The combination, with beam mechanism and with a load-receiver supported thereon, of a main supply apparatus located above the load-receiver; a horizontally-disposed rock-shaft located between the load-receiver and main supply apparatus and supported for longitudinal movement; an auxiliary supply device carried by the said shaft; means connecting the rock-shaft and beam mechanism and effective for shifting the rock-shaft longitudinally in proportion to the movements of the load-receiver and beam mechanism;

and means for imparting a rocking movement to said shaft and auxiliary supply device at a predetermined point in the movement of said load-receiver.

15. In a weighing-machine, the combination, with beam mechanism and with a load-receiver supported thereon, of a valve-controlled main supply apparatus; a rock-shaft supported for longitudinal reciprocatory movements below the load-receiver; an auxiliary supply device carried by said shaft; gearing connecting the rock-shaft and beam mechanism and effective, concurrently with the ascending and descending movement of the load-receiver, for shifting the rock-shaft, longitudinally, distances proportionate to the distances traversed by the load-receiver; and means controlled by the beam mechanism, for imparting a rotative movement to the rock-shaft and auxiliary supply device.

16. In a weighing-machine, the combination, with beam mechanism and with a load-receiver supported thereon, of a valve-controlled main supply apparatus; a rock-shaft supported for longitudinal reciprocatory movements below the load-receiver; an auxiliary supply device carried by said shaft; gearing connecting the rock-shaft and beam mechanism and effective, concurrently with the ascending and descending movement of the load-receiver, for shifting the rock-shaft, longitudinally, distances proportionate to the distances traversed by the load-receiver; means controlled by the beam mechanism, for imparting a rotative load-discharge movement to the rock-shaft and auxiliary supply device, concurrently with the arrival of the load-receiver, at a predetermined point in the descending movement thereof; and means carried by the rock-shaft, for imparting a return movement to said auxiliary supply device.

17. In a weighing-machine, the combination, with beam mechanism and with a load-receiver supported thereon, of a horizontally-disposed auxiliary supply device located above the load-receiver; a rock-shaft carrying said supply device and supported for longitudinal reciprocatory movements; a rack carried by the rock-shaft; a segment-gear actuated by the beam mechanism and meshing with said rack; a locking device for normally holding the rock-shaft against rotative movement and, with the auxiliary supply device carried thereby, in position to receive a load; means controlled by the beam mechanism, for releasing the locking device at a predetermined point in the movements of the load-receiver, to thereby effect a discharge movement of the supply device; and means carried by the rock-shaft, for returning the supply device to its normal position.

18. In a weighing-machine, the combination, with beam mechanism and with a load-receiver supported thereon, of a gravitative oscillatory supply device supported above the load-receiver, for reciprocatory movements in a plane transverse to the plane of its oscillatory movement; means controlled by the beam mechanism, for shifting the supply device in one or the other direction horizontally concurrently with, and in proportion to the movements in one or the other direction of, the load-receiver; a locking device for normally holding the supply device against oscillatory movement; and a time-train controlled by the beam mechanism and operative after the arrival of the load-receiver, at a predetermined point in the movement thereof, for releasing the locking device, to effect an oscillatory movement of the supply device.

19. In a weighing-machine, the combination, with beam mechanism and with a load-receiver supported thereon, of a supply device located above the load-receiver, for independent movements in relatively transverse planes; means controlled by the beam mechanism, for advancing and retracting said device in a horizontal plane in accordance with, and to an extent in proportion to, the extent of ascending and descending movements of the load-receiver; and a time-train controlled by the movements of the beam mechanism, for effecting a vertical oscillatory movement of the supply device.

20. In a weighing-machine, the combination, with beam mechanism and with a load-receiver supported thereon, of a supply device supported for horizontal reciprocatory and vertically-oscillatory movements; gearing actuated by the weighing mechanism, for imparting horizontal oscillatory movements to the supply device, concurrently with and in proportion to the movements of the load-receiver; a locking device for normally holding the supply device against oscillatory movements during the horizontal reciprocatory movements thereof; a time-train in operative relation with said locking device; a time-train-locking device for normally holding said time-train against movement; means controlled by the beam mechanism, for releasing the locking device of the time-train at a predetermined point in the movements of the load-receiver; and means carried by the time-train, for releasing the locking device that controls the oscillatory movement of the supply device.

21. In a weighing-machine, the combination, with beam mechanism and with a load-receiver supported thereon, of a supply device supported for oscillatory movement above the load-receiver; and means including a time-train, controlled by the beam mechanism, for effecting a movement of the supply device.

22. The combination, with beam mechanism and with a load-receiver, of a supply apparatus; and means including a time-train, actuated by the beam mechanism at a predetermined point in the movements of the load-receiver and adapted for governing the supply of material to said load-receiver.

23. In a weighing-machine, the combination, with beam mechanism and with a load-receiver, of a shiftable device in operative relation with the load-receiver; and means including a time-train, controlled by the beam mechanism, for actuating said shiftable device.

24. The combination, with beam mechanism and with a load-receiver supported thereon, of a main supply apparatus; an auxiliary supply device supported between the load-receiver and main supply apparatus, for horizontal reciprocatory and vertically-oscillatory movements; means controlled by the beam mechanism, for reciprocating the auxiliary supply device; and means including a time-train, for effecting an oscillatory movement of the auxiliary supply device at the expiration of a predetermined length of time after the load-receiver arrives at a predetermined point.

25. The combination, with beam mechanism and with a load-receiver supported thereon, of a fixed supply-chute located above the load-receiver; a valve in operative relation with the supply-chute; means controlled by the beam mechanism, for actuating said valve; a shiftable supply device located below the fixed supply-chute; and means including a time-train, controlled by the beam mechanism, for effecting a load-discharge movement of the shiftable supply device subsequently to the closure of the valve and the arrival of the load-receiver at a predetermined point.

26. The combination, with beam mechanism and with a load-receiver supported thereon, of a shiftable load-completer located above the load-receiver; a normally inactive time-train; means controlled by the beam mechanism, for starting the time-train at a predetermined point in the movement of the load-receiver; and means actuated by the time-train, for effecting a load-discharge movement of the load-completer.

27. In a weighing-machine, the combination, with beam mechanism and with a load-receiver supported thereon, of a load-completing device supported above the load-receiver, for oscillatory movement; means including a time-train, for effecting an oscillatory movement of the completing device; means controlled by the beam mechanism, for actuating the time-train at a predetermined point in the movement of the load-receiver; and means for normally locking the time-train against movement.

28. In a weighing-machine, the combination, with beam mechanism and with a shiftable member independent of the beam mechanism, of a time-train normally locked against movement; means controlled by the beam mechanism, at a predetermined point in the descending movement thereof, for unlocking the time-train; means for actuating the time-train after the same is unlocked; and means controlled by the time-train, for effecting a movement of the shiftable member.

29. In a weighing-machine, the combination, with an oscillatory scale-beam and with an independent shiftable member, of gearing operatively connecting the shiftable member and scale-beam and effective for imparting horizontal reciprocatory movements to said member, concurrently with and in proportion to the oscillatory movements of the scale-beam; and means including a time-train, controlled by the scale-beam, for effecting an oscillatory movement of said shiftable member at a predetermined point in the movements of the scale-beam.

30. In a weighing-machine, the combination, with framework, of a rock-shaft supported for horizontal reciprocatory movements; an oscillatory scale-beam supported on the framework; a rack in connection with the rock-shaft; and a segment-gear meshing with said rack and having its axis coincident with the axis of movement of the scale-beam and effective for reciprocating the rock-shaft concurrently with the oscillatory movements of the scale-beam.

31. In a weighing-machine, the combination, with framework, of a rock-shaft supported for horizontal reciprocatory movements; an oscillatory scale-beam supported on the framework; a rack in connection with the rock-shaft; a segment gear meshing with said rack and having its axis coincident with the axis of movement of the scale-beam and effective for reciprocating the rock-shaft concurrently with the oscillatory movements of the scale-beam; and means controlled by the scale-beam, at a predetermined point in the oscillatory movements thereof, for effecting a vertical oscillatory movement of the rock-shaft.

32. In a weighing-machine, the combination, with framework, of a rock-shaft supported for horizontal reciprocatory movements; an oscillatory scale-beam supported on the framework; a rack in connection with the rock-shaft; a segment-gear meshing with said rack and having its axis coincident with the axis of movement of the scale-beam and effective for reciprocating the rock-shaft concurrently with the oscillatory movements of the scale-beam; and means including a time-train, controlled by the beam mechanism, for imparting an oscillatory movement to the rock-shaft at the expiration of a predetermined length after the scale-beam arrives at a given point.

33. The combination, with a vertical oscillatory scale-beam, of a horizontal reciprocatory member; and means including a rack and a segment-gear operatively connecting, and effective for maintaining a predetermined ratio of movement between, the reciprocatory member and scale-beam.

34. In a weighing-machine, the combination, with beam mechanism and with a load-receiver supported thereon, of a main supply apparatus including an oscillatory valve; means controlled by the weighing mechanism, for actuating said valve; a gravitative load-completing device including a rock-shaft, supported for longitudinal reciprocatory movements; a rack carried by the rock-shaft; a rack-actuator meshing with said rack and operated by the beam mechanism, to impart a reciprocatory movement to the rock-shaft in accordance with the movements of the load-receiver; a catch-arm on said shaft; a latch normally engaging the catch-arm and holding the shaft against oscillatory movement; means controlled by the beam mechanism, for actuating the latch to release the rock-shaft and permit an oscillatory movement of the load-completing device; and means carried by the rock-shaft, for imparting a return movement thereto.

35. The combination, with beam mechanism and with a load-receiver supported thereon; of a rock-shaft supported above said load-receiver, for horizontal reciprocatory movements; a gravitative tilting receptacle carried by said rock-shaft; a rack carried by the rock-shaft; a segment-gear meshing with said rack and connected to, and adapted to be operated by, the beam mechanism, for reciprocating the rock-shaft; a locking device in connection with and effective for holding the rock-shaft normally against rocking movement; means including a time-train, controlled by the beam mechanism, for releasing the locking device, to effect a tilting movement of the receptacle; a counterweighted arm carried by the rock-shaft and effective for imparting a return movement thereto; and a main supply apparatus for supplying material to the load-receiver and the tilting receptacle.

36. In a weighing-machine, the combination with beam mechanism and with a load-receiver supported thereon, of a supply-chute having a main and a drip conduit, the latter of which is divided, by vertically-disposed partitions, into a series of drip-compartments; a load-completing device supported below the drip-conduit for reciprocatory movement; and means controlled by the beam mechanism for shifting the load-completing device in a horizontal plane crosswise of the several compartments of the drip-conduit, concurrently with and in proportion to the movements of the load-receiver, and for effecting an oscillatory load-discharge movement of the load-completing device at a predetermined point in the movement of said load-receiver.

37. In a weighing-machine, the combination, with oscillatory beam mechanism and with a load-receiver supported thereon, of a supply-chute having a main and a drip conduit, the latter of which has a series of vertically-disposed break-walls; a valve shiftable across the discharge ends of the two conduits; a load-completer supported below the break-walls for oscillatory movement in a vertical direction and for reciprocatory movement in a horizontal direction; and means controlled by the beam mechanism for shifting the load-completer in a horizontal direction, concurrently with the ascending and descending movements of the load-receiver, and for imparting an oscillatory load-discharge movement to said load-completer at a predetermined point in the movements of said receiver.

38. The combination, with a supply-chute, of two oppositely-disposed break-walls located above the chute in superposed relation; two break-wall-supporting shafts journaled in bearings at opposite sides, respectively, of the chute, and the upper one of which has a crank-arm located on the outside of said chute; a valve-carrying rock-shaft journaled in the chute below said break-walls; a valve fixed to said shaft; a crank-arm on said valve-shaft, located outside of said chute; a link pivotally connecting the valve-shaft crank-arm and the break-wall-shaft crank-arm; a break-wall-actuating arm fixed to the valve-shaft within the chute and having its free end in operative engagement with the lower break-wall; and means for imparting a closing movement to the valve and thereby simultaneously swing the break-walls inward and upward.

39. The combination, with beam mechanism and with a load-receiver supported thereon; of a supply-chute having a main and a drip conduit at the lower end thereof, the latter of which is divided by transverse vertical partitions into a series of drip-chambers; a valve supported for oscillatory movement across the discharge ends of the main and drip conduits; means controlled by the beam mechanism, for actuating said valve; a load-completing device supported below the drip-conduit, for horizontal reciprocatory movements across the several compartments of the drip-conduit; means controlled by the beam mechanism, for shifting the load-completing device horizontally concurrently with and in proportion to the movements of the load-receiver; and means controlled by said beam mechanism, for effecting an oscillatory load-discharge movement of the load-completing device subsequently to the closure of the valve and at the expiration of a predetermined length of time after the load-receiver has arrived at a given point.

40. The combination, with beam mechanism and with a load-receiver supported thereon, of a discharge-chute located at one side of the load-receiver and having its entrant ends above and intersecting the entrance of the load-receiver; a supply-chute having a main and a drip conduit, located above the load-receiver; a valve for controlling the supply from the main and the drip conduits; means controlled by the beam mechanism, for actuating said valve to supply an approximate load to the load-receiver; a gravitative oscillatory load-completing device located above the entrant ends of the load-receiver and discharge-chute and in vertical alinement with the drip-conduit of the supply-chute and supported for horizontal reciprocatory movements; means controlled by the beam mechanism, for shifting the load-completing device toward and from the discharge-chute a greater or lesser distance concurrently with and proportionate to the distance traversed by the load-receiver relatively to a given point, to thereby render the load-completing device effective for delivering a small or large charge of material to the load-receiver, as required, for completing the load; and means controlled by the beam mechanism, for imparting a load-discharge movement to the load-completing device.

41. The combination, with a load-receiver, of a closer comprising a series of independent closer-blades each having two independent axes of movement located in transverse planes one relatively to the other.

42. The combination, with a load-receiver, of a closer comprising a series of pivotally-supported closer-blades independently movable upon their individual axes, and also unitarily movable upon a common axis which is transverse to said individual axes.

43. The combination, with a load-receiver, of a closer comprising a closer-blade-supporting frame pivotally mounted on the load-receiver for oscillatory movements; and a series of closers each pivotally supported on said frame for oscillatory movements in directions transverse to the direction of oscillation of said frame.

44. The combination, with a load-receiver, of a gravitative closer embodying a series of pivotally-supported separately operable closer-blades having independent axes of movement located in substantial parallelism and having a common axis of movement located in a plane transverse to the plane of the independent axes.

45. The combination, with a load-receiver, of a gravitative closer pivotally supported on a bracket secured to said load-receiver and having a material-supporting wall composed of a series of closer-blades pivotally supported for oscillatory movement about their independent axes; and actuating instrumentalities in connection with the closer-blades and effective, on the descending and ascending movements of the closer, for imparting a rotative movement to said blades on their independent axes.

46. The combination, with a load-receiver, of a series of closer-blades pivotally supported for oscillatory movements about their independent axes and also supported for oscillatory movement about a common axis; and actuating instrumentalities in connection with the closer-blades and load-receiver and effective, on a movement of the closer-blades about their common axis, for imparting an oscillatory movement to said closer-blades about their individual axes.

47. The combination, with a load-receiver having a discharge-opening, of a series of closer-blades pivotally supported for rotative movement on independent axes below and adapted for normally closing the discharge-opening of the receiver and also supported for vertical oscillatory movement about a common axis; a locking device for normally holding the closer-blades against vertical oscillatory movement about their common axis; means for releasing said locking device, to effect a downward oscillatory movement of the closer-blades about their common axis; and means operative on the downward movement of the closer-blades, for imparting rotative movement thereto about their individual axes.

48. The combination, with a load-receiver, of a closer comprising a series of closer-blades movable in one direction in individual arcs and movable in a different direction in a common arc.

49. The combination, with a load-receiver, of a closer comprising a series of independent closer-blades supported for rotative movements in relatively different arcs and also for unitary movement in the same arc.

50. The combination, with a load-receiver, of a series of closer-blades supported for independent rotative movements in different arcs and also for unitary movement in the same arc; a crank in connection with each closer-blade; and means for actuating said cranks, to impart rotative movements to the closer-blades.

51. The combination, with a load-receiver, of a gravitative closer embodying a series of independent closer-blades supported for oscillatory movements in relatively different arcs and also for unitary movements in a common arc; a crank in connection with each closer-blade; and a cam device for actuating said cranks to impart oscillatory movements to said closer-blades in individual arcs simultaneously with the unitary movement of said blades in a common arc.

52. The combination, with a load-receiver, of a closer comprising a series of closer-blades supported for independent rotative movements in different arcs and also for unitary movement in the same arc; cranks fixed to, and movable in paths concentric to the path of movement of, said closer-blades; a cam-plate fixed to the load-receiver and having cam-faces engaging the ends of said cranks, said cranks and cam-faces being so disposed that, on the unitary movement of the closer-blades in the same arc, a rotative movement will be imparted to said closer-blades in different arcs.

53. The combination, with a load-receiver, of a gravitative closer having a rotative closer-blade; a crank on the closer-blade; and means carried by the load-receiver, for effecting a rotative movement of the crank and closer-blade simultaneously with the gravitative movement of said closer.

54. The combination, with a load-receiver; of a closer-blade carrier pivotally supported on the load-receiver, for vertical oscillatory movements; and a closer-blade pivotally supported on said carrier, for rotative movements in a path intersecting the path of oscillatory movement of said carrier.

55. The combination, with a load-receiver, of a closer-blade carrier pivotally supported intermediate its ends for vertical oscillatory movements; a closer-blade supported on said carrier, for rotative movements in a path intersecting the path of oscillatory movement of said carrier; and means controlled by the carrier, on the descending movement thereof, for imparting an oscillatory load-discharge movement to the closer-blade.

56. The combination, with a load-receiver, of a closer-blade carrier pivotally supported intermediate its ends for vertical oscillatory movements; a closer-blade pivotally supported on said carrier for rotative movement in a path intersecting the path of oscillatory movement of the carrier; a cam-plate fixed to the load-receiver and having a cam-groove therein; and a crank on the closer-blade and having the outer end thereof projecting into the cam-groove, whereby, on a vertical oscillatory movement of the closer-blade carrier, a rotative movement will be imparted to the closer-blade.

57. The combination, with a load-receiver; of a closer-blade carrier pivotally supported at one end thereof on the load-receiver, for vertical oscillatory movement; a series of independent closer-blades pivotally supported on said carrier, for opening and closing movements relatively to each other in paths intersecting the path of oscillatory movement of the carrier; a series of cranks fixed one to the end of each closer-blade and extending outward beyond the axis of movement of the carrier; and a cam-plate fixed to the load-receiver in the path of movement of the outer ends of the closer-blade cranks and having a series of cam-faces engaging the outer ends of said cranks, whereby, on the descending movement of the free end of the carrier, an opening movement will be imparted to the closer-blades about their individual axes.

58. The combination, with a load-receiver having a discharge-opening, of a closer pivotally supported at one end thereof for opening and closing movements relatively to said discharge-opening and embodying a series of closer-blades pivotally supported for rotative movements about independent axes and each having a crank at one end thereof movable in a path concentric to the arc of rotative movement of said blades; latch mechanism for normally holding the closer against opening movement; means for releasing said latch mechanism, to facilitate an opening movement of said closer; and a closer-blade actuator carried by the load-receiver in position to engage the cranks of the closer-blades, on the closing movement of the closer, to impart a rotative movement to said blades.

59. The combination, with a load-receiver having a closer and with a regulator-hopper located below said load-receiver, of a float located in the regulator-hopper and movable inward and outward in a plane intersecting the vertical axis of said hopper; and means connecting the float and closer in such manner that during the passage of material through the regulator-hopper the float will be forced outward thereby and will block the return or closing movement of the closer.

60. The combination, with beam mechanism and with a reciprocatory load-receiver supported thereon, of a gravitative closer pivotally supported on the load-receiver; means for locking the closer normally against opening movement; means controlled by the beam mechanism, for releasing, and facilitating an opening movement of, the closer; a regulator-hopper supported below said closer and having in one side thereof a float-guide; a gravitative float supported in said guide, for inward and outward movements in the arc of a circle and in a plane intersecting the vertical axis of the regulator-hopper; means connecting the float and closer and effective, when the float is in its retracted or upward position and the closer is in its open position, for blocking the return or closing movement of said closer; and means operative on the inward movement of the float, for imparting a return movement to said closer.

61. The combination, with a load-receiver and with a regulator-hopper, of an oscillatory gravitative closer; a float shiftably supported for movement toward and from the vertical axis of the regulator-hopper and operatively connected with the closer; and actuating means in connection with the closer.

62. The combination, with a load-receiver having a gravitative closer and with means for normally locking the closer in its closed position, of a regulator-hopper located below said closer; a float shiftably supported in the regulator-hopper and adapted to be forced outward in a plane intersecting the vertical axis of the hopper by the material flowing through said hopper; a link pivotally connected at its upper end to the closer, in the rear of the axis of movement thereof, and having a loop at its lower end engaging a projection on the float, whereby the closer will be locked against return movement when the float is in its retracted position and will be free to have a return movement when said float is in its advanced position; and a counterweight in connection with said closer and adapted for imparting return movement thereto when the float is in its advanced position.

FRANCIS H. RICHARDS.

Witnesses:
F. N. CHASE,
ANDREW FERGUSON.